United States Patent

[11] 3,562,607

[72] Inventor Alfons Matthijs Reinier van Iersel
Mollenhutseweg, Nijmegen, Netherlands
[21] Appl. No. 727,562
[22] Filed May 8, 1968
[45] Patented Feb. 9, 1971
[73] Assignee U.S. Philips Corporation
New York, N.Y.
a corporation of Delaware. by mesne assignments
[32] Priority May 12, 1967
[33] Netherlands
[31] C706641

[54] OVERLAY TYPE TRANSISTOR WITH BALLAST RESISTOR
6 Claims, 8 Drawing Figs.

[52] U.S. Cl. .......... 317/235, 29/578
[51] Int. Cl. .......... H01l 11/00
[50] Field of Search .......... 317/235, 29, 40.1, 40.13

[56] References Cited
UNITED STATES PATENTS
3,427,511 2/1969 Rosenweig .......... 317/235
FOREIGN PATENTS
658,963 1/1965 Belgium .......... 317/235
1,453,904 8/1966 France .......... 317/235
1,464,157 11/1966 France .......... 317/235
OTHER REFERENCES
ELECTRONICS, " The Overlay Transistor," by Carley et al., Aug. 23, 1965, pages 71— 75

*Primary Examiner*—Jerry D. Craig
*Attorney*—Frank R. Trifari

ABSTRACT: An overlay type transistor with a ballast resistor to avoid hot spots is described. The resistor comprises a layer of resistance material on each emitter zone, and the emitter contacts comprise a conductive strip on each resistor and overlying the emitter zones whereby the resistance through the thickness of the resistance layer is utilized.

Figure 1:
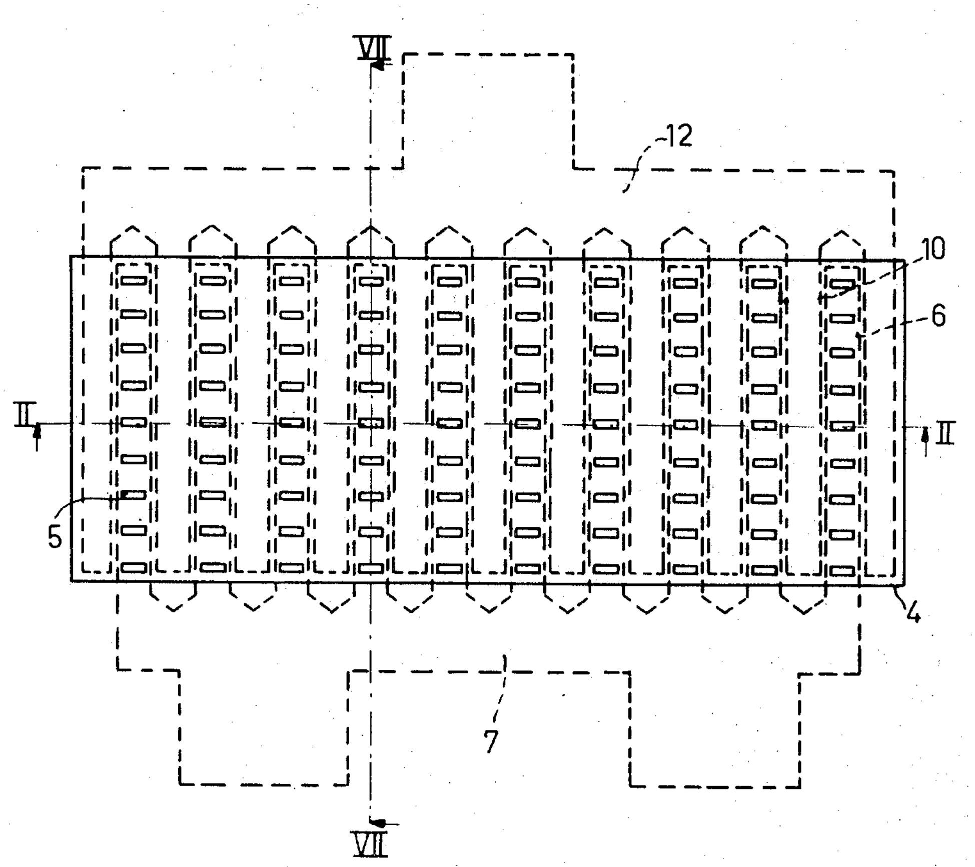

INVENTOR.
ALFONS M. R. van IERSEL
BY
Frank R Jrifari
AGENT

INVENTOR.
ALFONS M. R. van IERSEL

BY

Frank R. Trifari
AGENT

INVENTOR.
ALFONS M. R. van IERSEL
BY
Frank R. Trifari
AGENT

OVERLAY TYPE TRANSISTOR WITH BALLAST RESISTOR

The invention relates to a semiconductor device comprising a semiconductor body, one surface of which is covered at least partly with an insulating layer, said device comprising at least one transistor having a plurality of emitter zones lying adjacent the insulating layer and arranged in rows, above which emitter zones apertures are provided in the insulating layer, whilst a metal track connected to the emitter zones is arranged across each row, said metal tracks being connected to a common conductor.

Semiconductor devices of the kind set forth are known and are particularly suitable for use at high frequencies ($>$ 100 Mc/s) and for a comparatively high power ($>$ 0.5 W), whilst owing to the presence of a great number of emitter zones the total emitter circumference is large as compared with the total emitter surface so that the efficiency of the emitter is raised.

The effect of such semiconductor devices is often restricted by the phenomenon known under the name of secondary breakdown. This phenomenon appears when at given voltage and current values the emitter current is concentrated in given regions of the emitter, so that local excessive heating is involved which may give rise to more or less serious damage of the transistor structure.

Efforts have been made to avoid or to reduce the secondary breakdown in said semiconductor devices by including a resistor in the emitter circuit in series with a row of emitter zones. When the current through one of the emitter zones increases over that through the other emitter zones, the voltage drop across the resistor also increases, which leads to a reduction of the emitter-base voltage and hence of the current through the emitter zone concerned so that secondary breakdown is avoided. However, this involves the disadvantage that not only the current through the emitter zone concerned is strongly reduced but also the whole row of emitter zones including the zone concerned is affected.

There is described a device in which each emitter zone consists of two regions, an emitting region and a region serving mainly as an emitter series resistance. In this case the aforesaid disadvantage is not involved. However, this structure has the disadvantage of the complicated manufacture of such bipartite emitting zones and of the additional space required for regions of sufficiently high resistance so that higher capacitance values are involved. This structure can therefore not be used for transistors of very high frequencies (about 1000 Mc/s).

The invention is based on the recognition of the fact that by using resistors formed by the resistance of a layer transverse of the direction of the layer, instead of extending in the direction of the layer as in planar structures, it is possible to manufacture a structure in which the aforesaid disadvantage of the known semiconductor devices are avoided or materially reduced.

The invention has for its object to provide such a structure and, in addition, a method of manufacturing such a structure in simple manner.

According to the invention, a semiconductor device of the kind set forth is characterized in that between each emitter zone and the metal track located above the same there is provided a resistance formed by resistance material applied in the opening to the emitter zone and separating the emitter zone from the superjacent metal track.

The structure according to the invention has the advantage that, when the current through one of the emitter zones increases, only the emitter-base voltage of this one zone is decreased by a voltage drop across the associated resistor, whereas the other emitter zones are substantially not affected.

This structure has furthermore the advantage that the applied protective resistors do substantially not take additional surface area, so that the invention may be applied to transistors for very high frequencies, having very small emitter zone dimensions.

Moreover, the application of the resistors does not require a complex emitter structure, since the resistors do not form part of the semiconductor body.

As stated above the invention is particularly important for semiconductor devices having very small emitter zones, smaller than 20 $\mu$, preferably smaller than 10 $\mu$, in which devices the provision of sufficiently high resistances in series with the emitter zones by known methods is, in practice, not possible or can be carried out only with great difficulty.

The resistance material used may in principle be any material having a sufficiently high resistivity and being capable of forming a satisfactory, reproducible ohmic contact both with the emitter zone and with the superjacent metal track. According to the invention, it is advantageous, however, to use resistance material containing tantalum and/or silicon or oxides of said elements. It is particularly advantageous to use resistance material consisting of tantalum and silica, which material can be applied in a very simple, effective manner, as will be described more fully hereinafter. Moreover, by varying the ratio of mixing of the constituents the desired resistivity of this material can be obtained in a simple manner.

In accordance, inter alia, with the emitter current and the number of emitter zones the emitter series resistors may have discrete values lying in most cases of some importance between about 0.5 and 10 ohms.

For the manufacture of a semiconductor device according to the invention it is advantageous to use the sputtering method. The resistance materials employed, for example, a Ta-$SiO_2$ mixture, can often be etched selectively either not at all or only with great difficulty, without the semiconductor body or the insulating layer being affected so that the desired pattern of resistors cannot be provided by the conventional etching techniques in practice.

In a method of manufacturing such a semiconductor device in which the semiconductor body is provided with a transistor structure having a plurality of emitter zones arranged in rows and being adjacent a body face covered with an insulating layer, above which emitter zones openings are made in the insulating layer, after which metal tracks are applied across the rows, said surface is provided in accordance with the invention, prior to the application of the metal tracks, with a layer of resistance material, to which subsequently a metal layer is applied at the areas of the resistors to be obtained, after which by sputtering the part of the resistance material not covered by the metal layer is removed completely and the metal layer is removed over only part of its thickness and subsequently said metal tracks are applied across the formed resistors covered by the metal layer.

In an important embodiment the resistance material is also applied by sputtering. This method of application has the important advantage inter alia that by varying the composition of the atomizing source the correct mixing ratio can be fixed in a simple manner for obtaining the desired resistivity. Moreover, the resistance materials employed can be applied only with difficulty by vapor-deposition or in a different manner.

For the masking metal layer in principle any metal can be employed which allows selective etching. The applied metal layer should have such a thickness that during the time required for the complete removal of the uncovered parts of the resistance material the metal layer has not yet completely vanished from the areas of the resistors. With each metal chosen the required thickness can be easily found.

It is, however, particularly advantageous to use a masking metal having a low sputtering speed with respect to the resistance material. It is then sufficient to apply a comparatively thin metal layer, so that the definition of the metal pattern obtained by etching is considerably improved. Accordingly to the invention it is therefore advantageous to use a metal layer consisting of aluminum which has only a low sputtering rate even with high-frequency sputtering, for example, a much lower rate than the aforesaid advantageous resistance material containing tantalum and silica.

Figure 6:
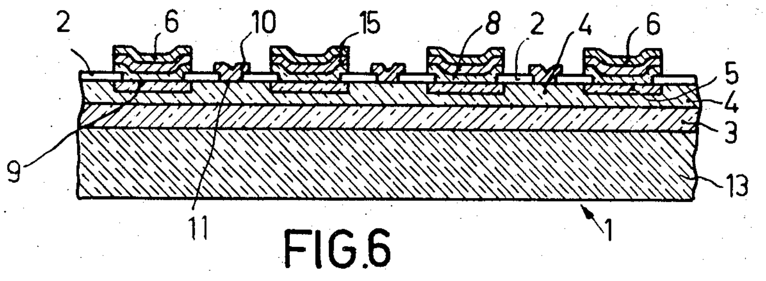
Figure 7:
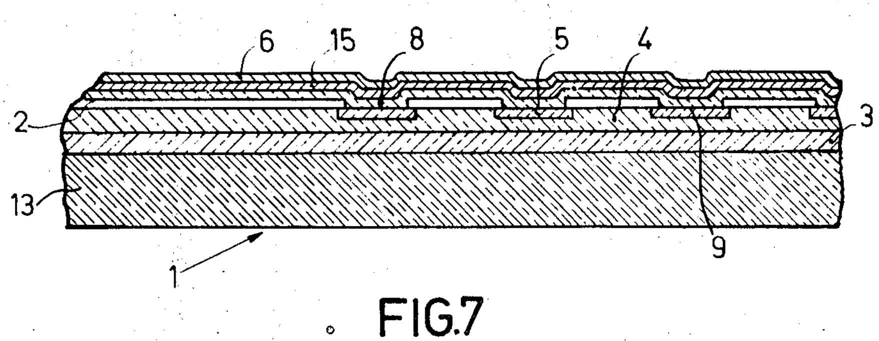
Figure 8:
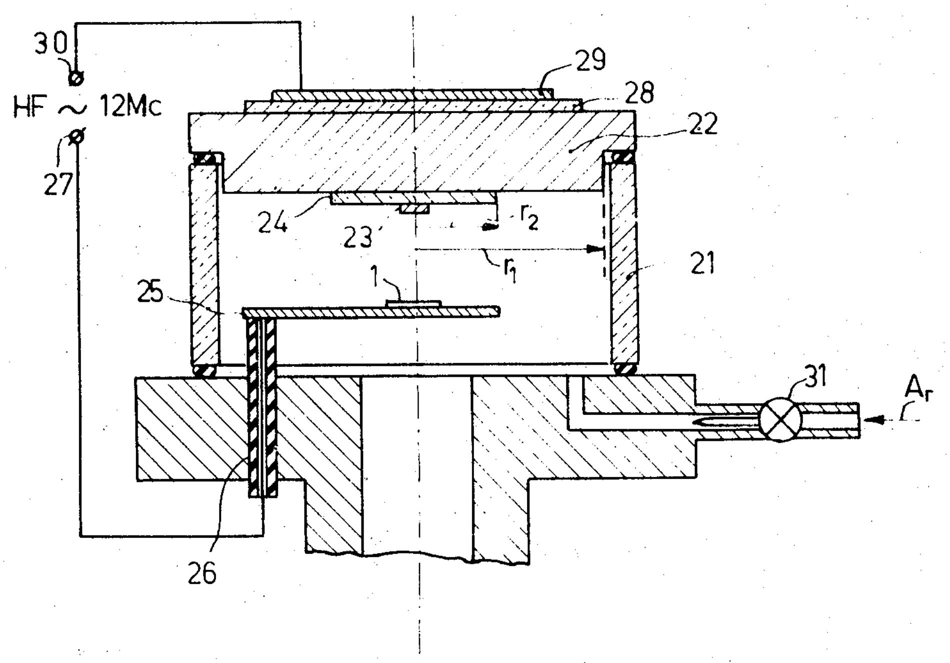

The invention will now be described more fully with reference to one embodiment and the drawing, in which:

FIG. 1 is a plan view of a high-frequency power transistor according to the invention, FIGS. 2 to 5 are schematically cross-sectional views taken on the line II–II in various stages of manufacture of the transistor of FIG. 1, FIG. 6 is a diagrammatic partial cross-sectional view taken on the line II–II of the transistor of FIG. 1, FIG. 7 is a diagrammatic partial cross-sectional view taken on the line VII–VII of the transistor of FIG. 1 and FIG. 8 is a diagrammatic cross-sectional view of a device for manufacturing a semiconductor device according to the invention.

FIG. 1 is a plan view and FIGS. 6 and 7 are diagrammatic cross-sectional views of a semiconductor device according to the invention. In a semiconductor body 1 of silicon (see FIGS. 6, 7), one face of which is partially covered with an insulating oxide layer 2, there is provided a transistor having a N-type conductive epitaxial collector zone 3, a diffused P-type conductive base zone 4 and a plurality of N-type conductive diffused emitter zones 5 (here 90 ). The emitter zones 5 of a length of 10 μ and a width of 3 μ are arranged in 10 rows of nine zones (see FIG. 1) spaced apart by a distance of 13 μ between the rows and of 5 μ between the zones in each row and are adjacent the oxide layer 2. For the sake of clarity the FIGS. are not to scale, particularly with respect to the dimensions transverse of the silicon wafer.

Above the emitter zones 5 (see FIGS. 6, 7) openings 9 are provided in the insulating layer 2 and across each row an aluminum track (6, 15) is connected with the emitter zones 5, said tracks being connected to a common connecting conductor 7 also formed by an aluminum layer. See FIG. 1: the metal layers applied to the surface are indicated in the plan view by broken lines.

According to the invention a resistor 8 is provided between each emitter zone 5 and the superjacent metal track (6, 15), which resistor consists of resistance material applied in the openings 9 to the emitter zones 5 and separating the zone 5 from the metal track (6, 15). This resistance material consists in this embodiment of a mixture of tantalum and silica in such a ratio that the resistivity is about 0.005 ohm cm. The thickness of the resistance layer 8 is about 2 μ, which provides a value of about 3 ohms per resistor.

The base zone 4 is contacted by aluminum strips 10 (see FIG. 1) between the rows of emitter zones, which strips 10 establish via the openings 11 (see FIG. 6) in the oxide layer 2 a contact with the base zone 4 and form an interdigital system with the metal tracks (6, 15). Also these strips 10 are connected to a common connecting conductor 12 formed by an aluminum layer. The collector zone 3 is formed by an epitaxial layer applied to a highly doped N-type conductive substrate 13, which is contacted on the lower side of the silicon wafer and provides a satisfactory ohmic contact with the collector zone. The transistor described may be employed for frequencies to above 1000 Mc/s and a maximum emitter current of 200 mA. This transistor may be manufactured in the manner to be described below.

By methods commonly employed in semiconductor technology a highly doped N-type conductive silicon substrate 13 (see FIG. 2) having a resistivity of 0.01 ohm cm. is provided with an epitaxial N-type conductive layer 3 of a thickness of 6μ and a resistivity of 3 ohm cm. By selective diffusion a P-type base region 4 and N-type emitter zones 5 are then provided in said epitaxial layer in known manner. The base zone 4 has a penetration depth of 1.1 μ and a layer resistance of about 160 ohms sq. The emitter zones 5 have a penetration depth of 0.8 μ and a layer resistance of about 5 ohms sq.

Figure 2:
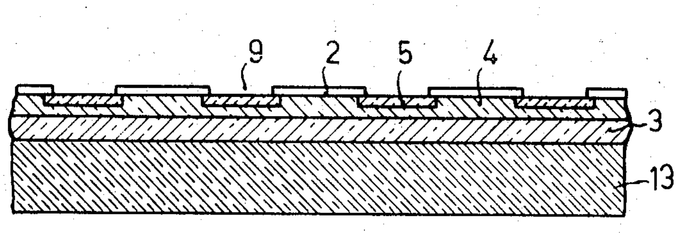
Figure 3:
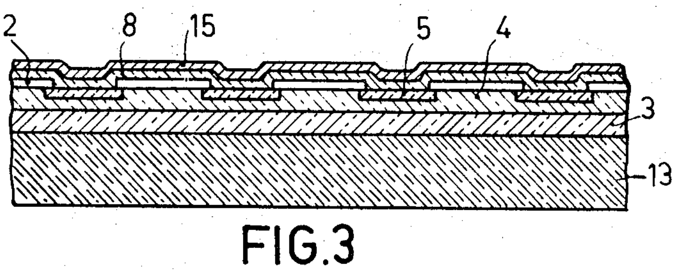

Windows 9 are then provided above the emitter zones 5 in the oxide layer 2 formed during said operations by using known etching techniques, so that the structure is obtained as shown in the partial sectional view of FIG. 2.

Then a layer 8 of resistance material is applied throughout the surface (see FIG. 3) which layer consists of tantalum and silica of a resistivity of 0.005 ohm cm. and a thickness of 2 μ. In this embodiment the layer 8 is applied in a particularly simple manner by sputtering or atomizing the resistance material by the so-called high-frequency sputtering method. This technique is elaborately set out by P.D. Davidse in "Semiconductor Products and Solid State Technology," December 1966, pages 30 to 36. In the present example (see FIG. 8) a vacuum bell 21 is used, the upper side of which is formed by a plate 22 of tantalum having a radius $r_1$, to which a quartz disc 24 of a radius $r_2$ is secured by means of a tantalum bolt 23. The silicon wafer 1 to be processed is conductively connected to a metal support 25, which is connected via the insulated through-connection 26 to the connecting terminal 27 and is located at a distance of about 25 mms. from the tantalum plate 22. The tantalum plate 22 is covered by a glass plate 28 of about 2 mms. thickness, on which a metal plate 29 is arranged, which is conductively connected to a connecting terminal 30, so that the tantalum plate 22 is capacitatively connected to the terminal 30.

The radius $r_1$ is about 60 mms., the radius $r_2$ is about 27 mms. By varying the ratio $r_2/r_1$ the composition of the atomized $Ta\text{-}SiO_2$ mixture can be changed and hence the resistivity thereof.

For applying the layer 8 (see FIG. 3) the terminal 27 is put at earth potential, whereas a high-frequency voltage of *12* Mc/s having a peak-to-peak value of about 2000 v. is applied between the terminals 27 and 30. Via the needle valve 31 argon is introduced to a pressure of about $10^{-2}$ mm. With said values of $r_1$ and $r_2$ a $Ta\text{-}SiO_2$ layer 8 of about 2 /μ thickness and a resistivity of about 0.005 ohm cm. is then deposited on the silicon within 120 minutes.

Figure 4:
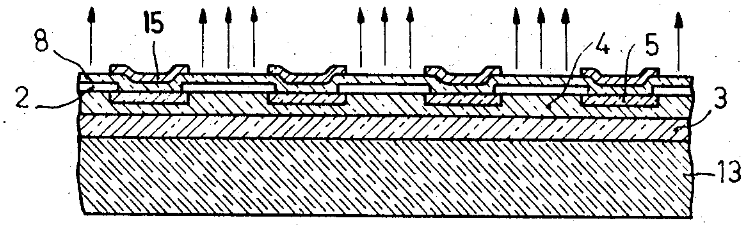
Figure 5:
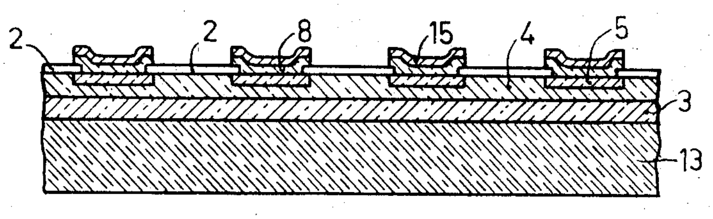

To this layer 8 is then applied from the vapor phase an aluminum layer 15 of about 0.5 μ thickness (see FIG. 3), which aluminum layer is subsequently shaped in the form of the desired pattern by means of one of the many photolithographic etching techniques conventionally employed in semiconductor technology (see FIG. 4). The parts of the layer 8 not covered by aluminum are then removed as is indicated by the arrows in FIG. 4 by sputtering in the reverse direction (for which purpose in FIG. 8 only the potentials at the terminals 27 and 30 have to be interchanged, whilst the plates 22 and 24 are replaced by a metal plate, for example, a copper plate). This results in the structure of FIG. 5, where the aluminum is partially volatilized and is left partially where it prevents volatilization of the subjacent $Ta\text{-}SiO_2$ layer. By means of conventional photolithographic etching methods windows 11 are etched in the oxide layer 2 above the base zone 4, after which by employing conventional vapor-deposition and etching methods the aluminum tracks 6 and 10 are applied (see FIGS. 1, 6, 7) for contacting said resistors 8 and the base zone 4.

It will be obvious that the invention is not restricted to the embodiment described above and that within the scope of the invention many variants are possible to those skilled in the art. For example, the resistance layer 8, instead of being applied in the form of strips, may be applied in the form of discrete, island-shaped regions on the emitters. Moreover, other materials, other arrangements and other parameters may be used in the sputtering process and other methods may be employed for applying the resistance material, whilst also the geometry of the transistor may be different.

I claim:

1. A semiconductor transistor comprising a semiconductor body portion having a surface, a plurality of spaced emitter zones adjacent the said surface and arranged in plural rows, the maximum dimension of each emitter zone being smaller than 20 microns, an insulating layer on said surface having openings over the emitter zones, an emitter resistor connected to each emitter zone, said resistor comprising deposited resistance material in the emitter opening and on the emitter zone at the body surface, plural conductive tracks exhibiting metallic conductivity each connected to plural emitter zones in different rows, each said conductive track extending across the rows and overlying the connected emitter zones in each row and on and in contact with the deposited resistance material on each zone, said resistors separating the emitter zones from the overlying conductive track, and means exhibiting metallic conductivity forming a common conductive connection to the conductive tracks.

2. A transistor as set forth in claim 1 wherein the resistors for the connected emitter zones are united in the form of a continuous strip underlying the conductive track making the connections.

3. A transistor as set forth in claim 2 wherein the width of the resistor strip and that of the overlying conductive track are the same.

4. A transistor as set forth in claim 1 wherein the resistance material contains tantalum or tantalum oxide.

5. A transistor as set forth in claim 4 wherein the resistance material contain silicon or silica.

6. A transistor as set forth in claim 1 wherein each resistor has a value between 0.5 and 10 ohms.

UNITED STATES PATENT OFFICE

CERTIFICATE OF CORRECTION

Patent No. 3,562,607 Dated February 9, 1971

Inventor(s) Alfons Matthijs Reinier van Iersel

It is certified that error appears in the above-identified patent and that said Letters Patent are hereby corrected as shown below:

On the cover sheet [31], "C706641" should read -- 6706641 --.

Signed and sealed this 17th day of August 1971.

(SEAL)
Attest:

EDWARD M.FLETCHER,JR.
Attesting Officer

WILLIAM E. SCHUYLER,
Commissioner of Paten